United States Patent
Zhou

(10) Patent No.: US 6,792,178 B1
(45) Date of Patent: Sep. 14, 2004

(54) FIBER OPTIC HEADER WITH INTEGRATED POWER MONITOR

(75) Inventor: Ping Zhou, Glendale, AZ (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 09/481,627

(22) Filed: Jan. 12, 2000

(51) Int. Cl.[7] .................................................. G02B 6/26
(52) U.S. Cl. .............................. 385/31; 385/39; 385/47; 385/49; 385/88
(58) Field of Search ........................... 385/31, 39, 47, 385/49, 88

(56) References Cited

U.S. PATENT DOCUMENTS

| | | | |
|---|---|---|---|
| 4,092,061 | A | 5/1978 | Stigliani, Jr. |
| 4,130,343 | A | 12/1978 | Miller et al. |
| 4,165,496 | A | 8/1979 | Di Domenico, Jr. et al. |

(List continued on next page.)

FOREIGN PATENT DOCUMENTS

| | | |
|---|---|---|
| DE | 19527026 | 7/1995 |
| EP | 0355522 A2 | 8/1989 |
| EP | 0335691 | 10/1989 |
| EP | 0413489 A2 | 8/1990 |
| EP | 0619507 | 10/1994 |
| EP | 0786838 A2 | 1/1997 |
| GB | 2312551 A | 10/1997 |
| JP | 58153388 | 9/1983 |
| JP | 59007940 | 1/1984 |
| JP | 60086887 | 5/1985 |
| JP | 60088486 | 5/1985 |
| JP | 60180183 | 9/1985 |
| JP | 61206284 | 9/1986 |
| JP | 62269374 | 11/1987 |
| JP | 63066985 | 3/1988 |
| JP | 63084184 | 4/1988 |
| JP | 63280206 | 11/1988 |
| JP | 63280574 | 11/1988 |
| JP | 1140791 | 6/1989 |
| JP | 1227484 | 9/1989 |

(List continued on next page.)

OTHER PUBLICATIONS

Ali, Akbar, "New Materials and Design Components for Integrated Optics", Technology Report/Fiberoptics, President, Glass & Ceramics Intl., Inc. 2017 Lomita Blvd., Lomita California.

Cohen, M.S., et al., "Passive Laser–Fiber Alignment by Index Method", 1991 IEEE Photonics Technology Letters, pps. 985–987.

Faris, Jeff, et al., "DMD packages—Evolution and strategy", TI Technical Journal, Jul.–Sep. 1998, pps. 97–94.

(List continued on next page.)

*Primary Examiner*—Hemang Sanghavi
*Assistant Examiner*—Sung Pak
(74) *Attorney, Agent, or Firm*—Workman Nydegger

(57) ABSTRACT

An optical header for coupling a light source to an optical fiber is disclosed. The header preferably includes a ceramic substrate that has a recess for a vertical cavity surface emitting laser (VCSEL), or alternatively an edge emitting laser. An optical fiber is preferably attached to a ceramic substrate and terminates at a light source. The end of the fiber is preferably cleaved or polished to an angle such that light entering the fiber from the light source is substantially reflected into the fiber. A reflective coating is placed on the cleaved end of the fiber thereby permitting a small percentage of light to radiate away from the fiber and toward an intensity detector. The light preferably travels to the detector through a transmission medium such as a prism or an optical-grade epoxy. The header is particularly useful when used in conjunction with multiple fibers simultaneously to form an optical fiber array. The header is also useful to house an optical receiver, or to form a bi-directional header suitable for fiber optic communications.

13 Claims, 4 Drawing Sheets

U.S. PATENT DOCUMENTS

| | | |
|---|---|---|
| 4,329,659 A | 5/1982 | Chen |
| 4,381,882 A | 5/1983 | Sabine |
| 4,403,273 A | 9/1983 | Nishioka |
| 4,441,805 A | 4/1984 | Smith |
| 4,653,844 A | 3/1987 | Ward |
| 4,865,417 A | 9/1989 | Yamamoto Naohiro et al. |
| 4,897,711 A | 1/1990 | Blonder et al. |
| 4,952,016 A | 8/1990 | Adams et al. |
| 4,962,991 A | 10/1990 | Carvalho |
| 4,981,334 A | 1/1991 | Sniadower |
| 5,125,054 A | 6/1992 | Ackley et al. |
| 5,146,516 A | 9/1992 | Blumke et al. |
| 5,163,113 A | 11/1992 | Melman |
| 5,243,671 A | 9/1993 | Koteles et al. |
| 5,249,245 A | 9/1993 | Lebby et al. |
| 5,253,311 A | 10/1993 | Killen et al. |
| 5,253,312 A | 10/1993 | Payne et al. |
| 5,262,364 A | 11/1993 | Brow et al. |
| 5,357,103 A | 10/1994 | Sasaki |
| 5,359,686 A | 10/1994 | Galloway et al. |
| 5,361,317 A | 11/1994 | Hartman et al. |
| 5,371,820 A | 12/1994 | Welbourn et al. |
| 5,375,184 A | 12/1994 | Sullivan |
| 5,390,271 A | 2/1995 | Priest |
| 5,414,786 A | 5/1995 | Ohta et al. |
| 5,420,954 A | 5/1995 | Swirhun et al. |
| 5,499,309 A | 3/1996 | Kozuka et al. |
| 5,499,312 A | 3/1996 | Hahn et al. |
| 5,533,158 A | 7/1996 | Han et al. |
| 5,539,848 A | 7/1996 | Galloway |
| 5,545,893 A | 8/1996 | Brown et al. |
| 5,574,814 A | 11/1996 | Noddings et al. |
| 5,596,662 A | 1/1997 | Boscher |
| 5,613,024 A | 3/1997 | Shahid |
| 5,625,734 A | 4/1997 | Thomas et al. |
| 5,666,449 A | 9/1997 | Sawae et al. |
| 5,696,862 A | 12/1997 | Hauer et al. |
| 5,706,378 A | 1/1998 | Suzuki et al. |
| 5,717,800 A | 2/1998 | Funabashi |
| 5,724,464 A | 3/1998 | Kozuka |
| 5,734,765 A | 3/1998 | Artjushenko et al. |
| 5,744,848 A | 4/1998 | Harazono |
| 5,774,614 A | 6/1998 | Gilliland et al. |
| 5,790,731 A | 8/1998 | Deveau |
| 5,808,325 A | 9/1998 | Webb |
| 5,814,870 A | 9/1998 | Spaeth |
| 5,977,567 A | 11/1999 | Verdiell |
| 6,081,638 A * | 6/2000 | Zhou ........................... 385/31 |
| 6,130,448 A | 10/2000 | Bauer et al. |
| 6,194,789 B1 | 2/2001 | Zhou |
| 6,205,274 B1 | 3/2001 | Zhou |
| 6,222,967 B1 | 4/2001 | Amano et al. |
| 6,388,264 B1 | 5/2002 | Pace |
| 6,521,989 B2 | 2/2003 | Zhou |

FOREIGN PATENT DOCUMENTS

| | | |
|---|---|---|
| JP | 1256189 | 10/1989 |
| JP | 2090585 | 3/1990 |
| JP | 2106989 | 4/1990 |
| JP | 2222185 | 9/1990 |
| JP | 4324987 | 11/1992 |
| JP | 5021899 | 1/1993 |
| JP | 5279967 | 11/1993 |
| JP | 6209183 | 7/1994 |
| JP | 6216406 | 8/1994 |
| JP | 8101759 | 4/1996 |
| JP | 8241900 | 9/1996 |
| JP | 9041951 | 2/1997 |
| WO | WO 92/00538 | 1/1992 |

OTHER PUBLICATIONS

Kosaka, et al., "Plastic–Based Receptacle–Type VCSEL–Array Modules with One and Two Dimensions Fabricated Using the Self–Alignment Mounting Technique", Electronic Components and Technology Conference, 1997. pps. 382–390.

Norton, L.J. et al., "Optobus I: A Production Parallel Fiber Optical Interconnect", Electronic Components and Technology Conference, 1997, pps. 204–209.

Plawsky, Joel L., et al., "Photochemically machined, glass ceramic, optical fiber interconnection components", Corning Glass Works, Corning NY 14831, SPIE vol. 994 Optoelectronic Materials, Devices, Packaging and Interrconnects (1988) pps. 101–106.

Shweky, et al., "A CSP Optoelectronic Package For Imaging And Light Detection Applications", Part of the IS&T/SPIE Conference on Sensors, Cameras, and Applications, pp. 63–68, 1999.

Spector, Dr. Murray, "Design of a Solid State Laser Hybrid Package", International Journal for Hybrid Microelectronics, vol. 5, No. 2, Nov. 1982, pps. 172–174.

Sullivan, Charles T., et al., "Polymeric Waveguides", IEEE Jan. 1992, pps. 27–31.

Teska, Mike, "Fine Line PCB Assembly Leads to New Test Issues", Electronic Packaging & Production, pp. 54–56, 1998.

Havant, "Flexible Interposing Carrier Scheme for Optical Waveguide", p. 512, Research Disclosure 30344.

"Optical Connection Circuit", Japanese Abstract publication #63–280206, vol. 13, No. 98, p. 840, Mar. 8, 1989.

* cited by examiner

FIBER OPTIC HEADER WITH INTEGRATED POWER MONITOR

FIELD OF THE INVENTION

The present invention relates generally to fiber optic communications. More particularly, the invention relates to a header arrangement for coupling light from a light source into an optical fiber, the header including a monitor for tracking the intensity of the light.

BACKGROUND OF THE INVENTION

Communications systems employing optical fibers are well known in the art. These systems typically transmit data by using a light source, such as a laser, to emit pulses of light onto a waveguide. The waveguide, often implemented as a glass fiber, transmits the light pulses to an optical receiver that senses the pulses of light and provides a corresponding output signal (typically an electrical signal) to a receiving system.

Optical communications systems may span large geographic regions, or they may be implemented within single electronic components. Recently, vertical cavity surface emitting lasers (VCSELs) have been recognized as being useful in small-scale communications systems. Indeed, it has been suggested that optical systems utilizing VCSELs may eventually replace many systems that currently rely upon copper wires to transmit electrical data signals. The advantages of optical communications systems over electrical systems commonly include high bandwidth and low signal loss which often results as optical data signals travel through the length of the fiber. Moreover, several optical fibers may be bundled together in a "fiber array" to form a communications channel that is capable of transmitting multiple signals simultaneously.

An important element of any optical communications system is a method of coupling light emanating from a light source into the waveguide. Typically, a laser light source is coupled into an optical fiber in a Aheader block=arrangement. The most commonly used form of header uses the well-known "butt coupling" method shown in FIG. 1. "Butt coupling" involves positioning the laser so that light is directly emitted into an end of the optical fiber. Typically, a substrate made of silicon, ceramic or another material supports the laser and at least a portion of the optical fiber. The "butt coupling" method is particularly suited for use with edge emitter lasers that emit photons in an elliptical pattern, with the vertical axis of the pattern being longer than the horizontal axis.

A common practice is to cut a groove into the substrate to support the optical fiber. Although the groove often prevents lateral movement of the fiber, it also typically increases the difficulty in aligning the fiber with the light source since the elliptical pattern of light emanating from the edge emitter is substantially narrow in the lateral direction. The grooves must therefore be precisely placed or else significant amounts of light can be lost, thus degrading the transmitted optical signals.

Often, the intensity of the light emitted by the laser is not constant over time. For example, environmental effects such as temperature or humidity changes can affect the performance of the laser. To compensate for variations in laser output, it is frequently desirable to monitor the intensity of the light emitted by the laser. The intensity of the light is proportional to the output power of the laser, and the stability of the laser can be greatly improved by using the monitoring signal as feedback into the light source controls. This feedback signal is obtained by measuring the output intensity of the laser by a detector such as a photodiode and providing this signal to a well-known electronic feedback circuit that provides a drive signal to the laser as shown in FIG. 1.

Typically, it is impractical to measure the direct output of the laser, since an intensity detector cannot be placed between the laser and the optical fiber without significantly degrading the amount of light impinging upon the fiber. Many lasers, including edge emitting lasers, emit light at both the front and back ends of the lasing cavity, commonly called the front and back facets. The front facet is generally the primary output of the laser, with substantially fewer photons emanating from the back facet. Still, the light emanating from the back facet can provide an input to an intensity monitor in a feedback system. Using the back facet as an input to an intensity monitor, however, often results in two distinct disadvantages. First, the power output from the back facet is not always directly proportional to the light which enters the fiber from the front facet, since the relative intensities of light emanating from the front and back facets can vary over time. Moreover VCSELs do not typically have a back facet. Therefore, it is not desirable to use a VCSEL in a butt-coupling arrangement with a power monitor.

U.S. Pat. No. 5,163,113, issued Nov. 10, 1992 to Paul Melman, which is incorporated herein by reference, generally discloses a second form of a header block arrangement that includes an edge emitting laser configured to provide light in a vertical direction. As can be seen in FIG. 2A, an untreated optical fiber is cleaved at about a 45 degree angle, and this cleave is positioned directly above an edge-emitting laser attached to a submount block so that emitted light substantially impinges upon the inner face of the cleaved end of the fiber. Alternatively, an edge-emitting laser directs light horizontally toward a mirror, and the mirror reflects light vertically toward the fiber as shown in FIG. 2B. Because the optical fiber is untreated, light from the laser is substantially reflected by the cleaved end into the longitudinal axis of the fiber. This arrangement provides several advantages over the butt-coupling method. Most notably, the header is suitable for use with vertically-emitting VCSEL lasers. Moreover, the cleaved fiber approach allows improved fiber/light source alignment over the butt-coupling approach. However, this approach often exhibits a marked disadvantage in that monitoring the output intensity of the laser light source is impractical. Moreover, the elements required to implement this method with an edge emitter (namely the submount block in FIG. 2A or the mirror structure in FIG. 2B) are cumbersome to manufacture.

Accordingly, there exists a need for an optical header arrangement that efficiently couples light from an emitter source into an optical fiber while providing a substantially accurate measure of the intensity of the emitted light. Moreover, there exists a need for such a header to incorporate VCSEL lasers, to handle bi-directional optical communications, and to support arrays of fibers that are used in communications systems. This header should contain minimal components to simplify manufacturing.

SUMMARY OF THE INVENTION

In accordance with a preferred embodiment of the present invention, a header arrangement for an optical communication system is provided which efficiently couples light from a light source into an optical fiber while monitoring the output power of the light source.

In accordance with one aspect of the present invention, a header arrangement is configured to accommodate vertical cavity surface emitting lasers (VCSELs) as light sources, and is suitable for use in a fiber array.

Particularly, a preferred embodiment of the invention includes a header block that supports a VCSEL or edge-emitting laser which emits light vertically toward an optical fiber. The end of the fiber is preferably formed into an angle of approximately 45 degrees and suitably placed in contact with a partially reflective coating. Light from the laser travels through the bottom surface of the optical fiber until the light impinges upon the inner side of the coated face of the fiber. Although the coating reflects most of the light along the longitudinal axis of the fiber, a small portion of the light transmits through the coating and into a transfer medium such as a glass prism. The medium transfers the light to a detector that suitably measures the intensity of the light and develops an output signal. Other embodiments of the invention employ alternate transfer media such as optical adhesives.

In accordance with a further aspect off the present invention, a header design is proposed which may be efficiently manufactured, and which may be conveniently coupled to a fiber array with a minimum of redundant parts.

BRIEF DESCRIPTION OF THE DRAWING FIGURES

The above and other objects, features and advantages of the present invention are hereinafter described in the following detailed description of illustrative embodiments to be read in conjunction with the accompanying drawing figures, wherein like reference numerals are used to identify the same or similar parts in the similar views, and:

3. A HEADER FOR A FIBER ARRAY

Figure 1:
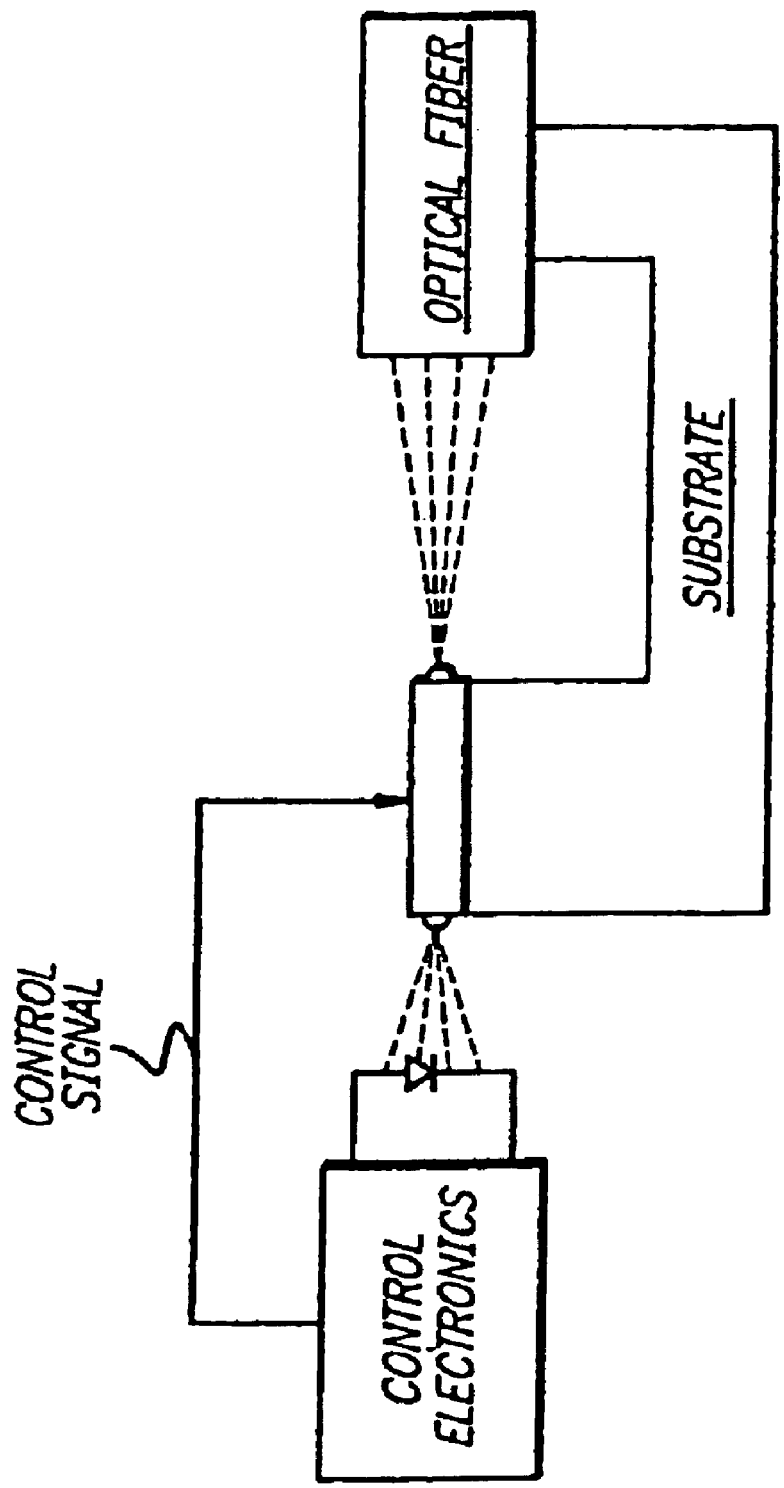
FIG. 1 is an exemplary cross-sectional view of a prior art header block utilizing the "butt coupling" method.
Figure 2B:
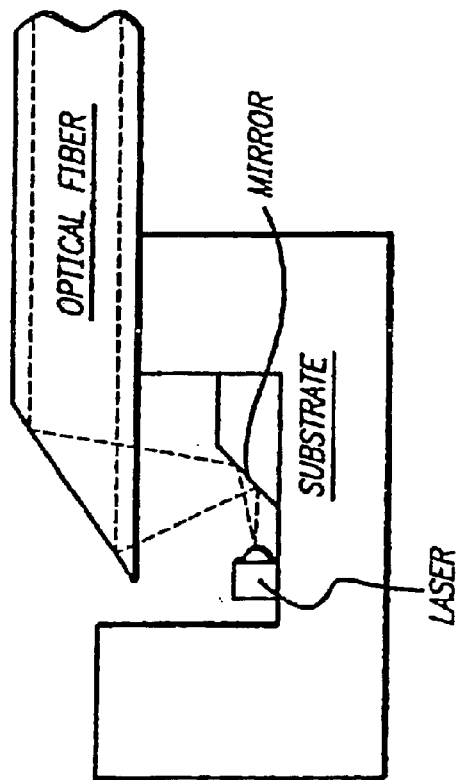
FIG. 2B is an exemplary cross-sectional view of a prior art header block utilizing a micro-mirror to deflect light from an edge-emitting laser into Ian optical fiber.
Figure 2A:
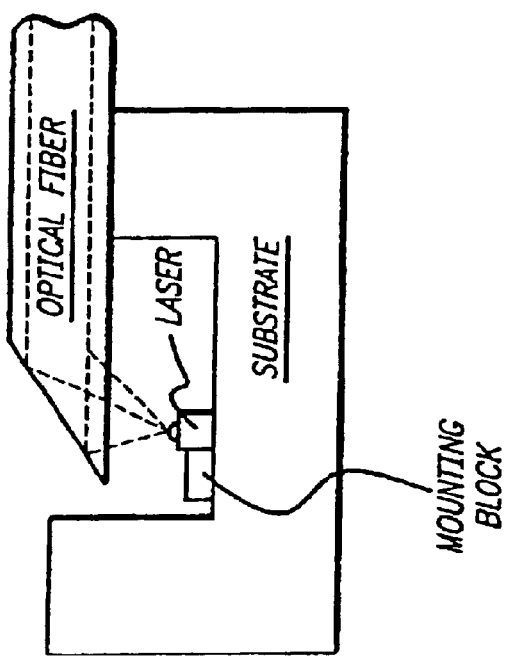
FIG. 2A is an exemplary cross-sectional view of a prior art header block utilizing an edge emitter submount block.
Figure 3:
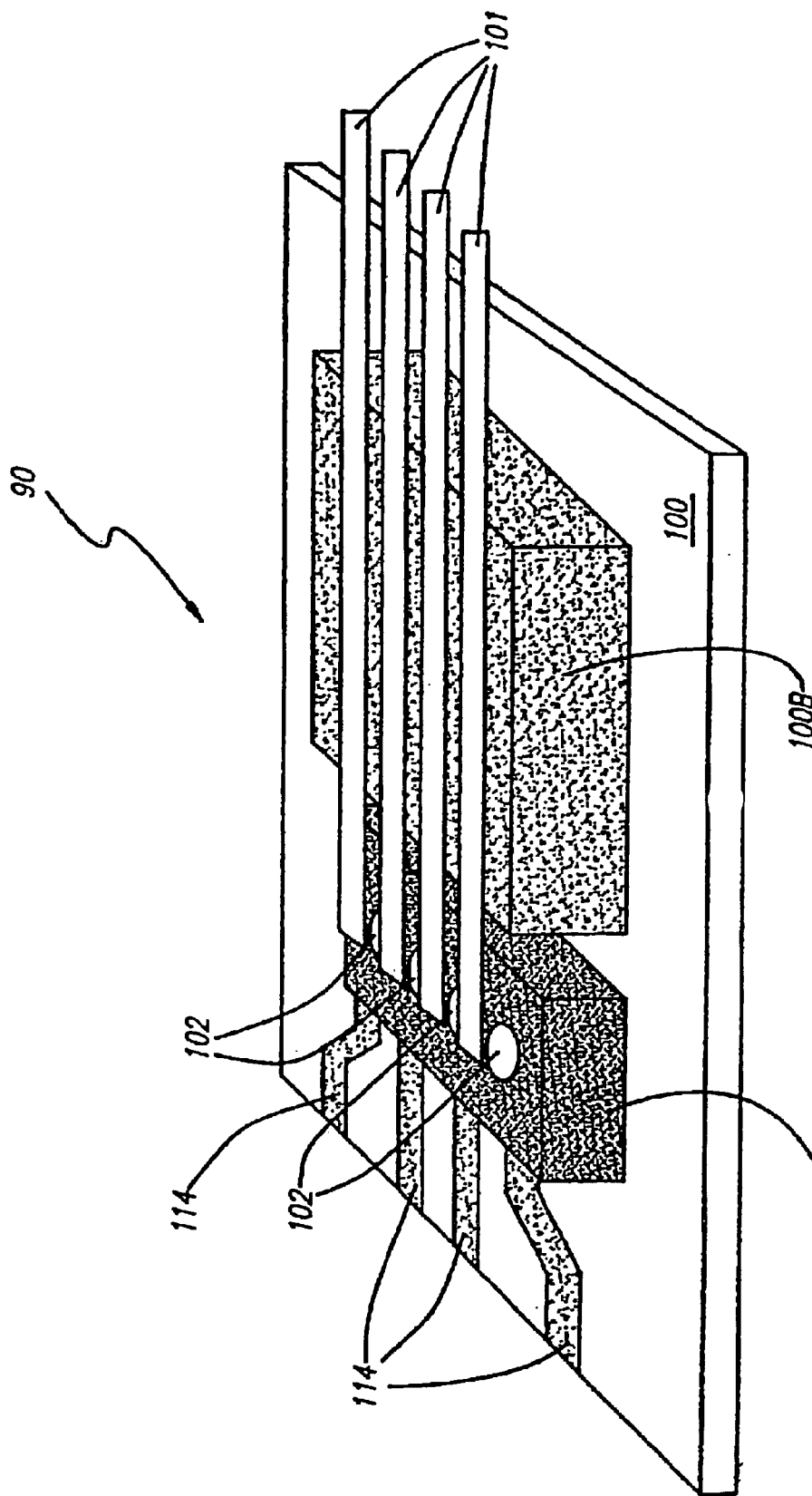
FIG. 3 is a perspective view of an exemplary incomplete header block of the present invention as implemented in a fiber array.
Figure 4:
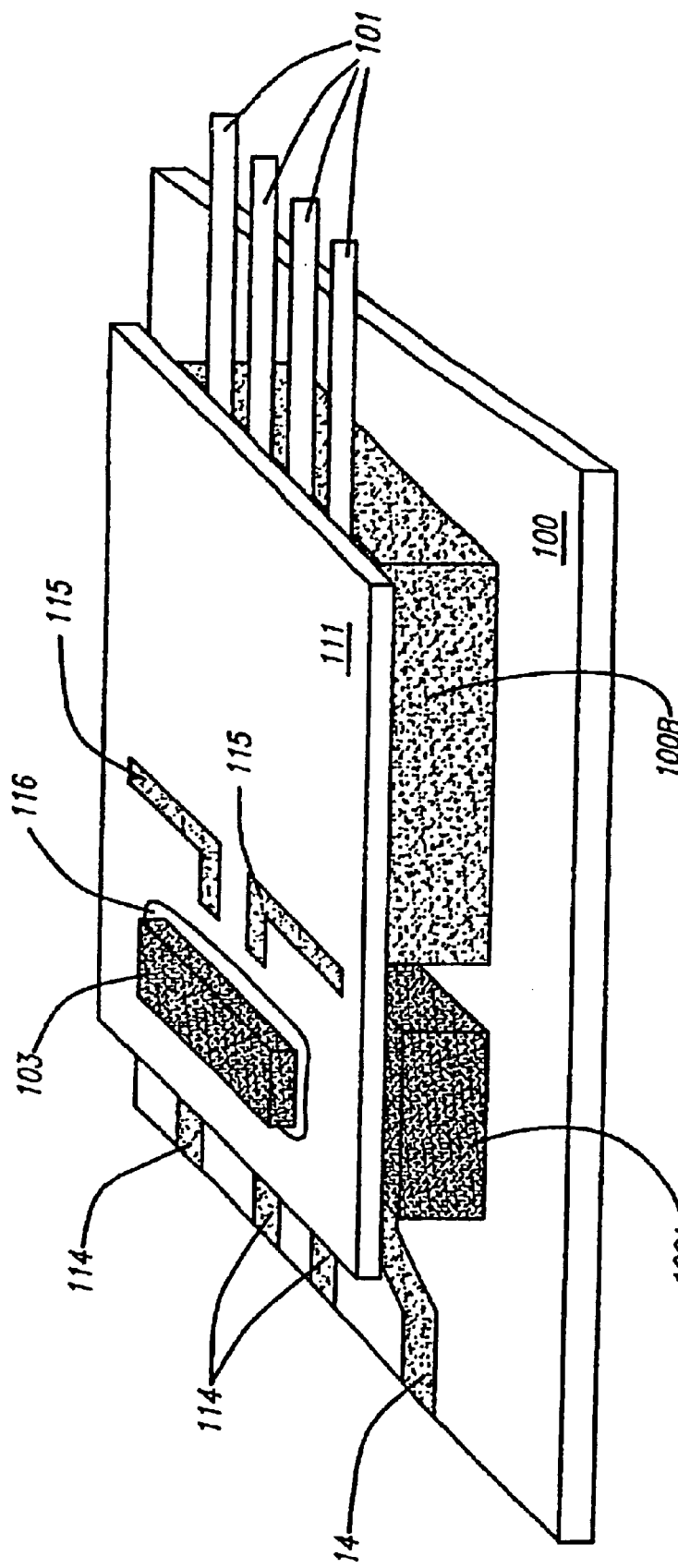
FIG. 4 is a perspective view of an exemplary header block of the present invention as implemented in a fiber array.

FIGS. 3 and 4 show perspective views of a header for a fiber array in accordance with a preferred embodiment of the present invention. The uppermost elements of the array (elements 103, 111, 116) have been removed in FIG. 3 to show the detail of the fiber/light source connection. The header shown in these drawings suitably couples multiple light source module 102 to multiple optical fibers 101, and preferably includes at least one intensity detector module 103 for monitoring the light emitted by the respective light sources comprising module 102.

Referring now to FIG. 3, a parallel submount assembly 90 for four optical fibers 101 is shown. A base layer of the substrate 100 preferably includes a metal trace 114 for each light source. These traces suitably act as electrodes that provide drive currents to light sources 102. Although the light sources 102 may receive electrical power in any way, the traces 114 embedded in substrate 100 provide a convenient, compact and easy-to-manufacture electrical conduit.

The base substrate in FIG. 3 also supports two secondary substrate blocks, one block (100A) surrounding the light sources (e.g. VCSEL light sources) and another block (100b) supporting the optical fibers. As discussed above, these substrate blocks may be implemented in any number of ways. The substrate could be formed as a single block, for example, or could be divided into many sub-blocks. However, the light sources 102 and optical fibers 101 are preferably supported by a single substrate structure 100 as shown.

The light sources 102 such as VCSELs or other laser light sources are suitably embedded within cavities formed in the substrate 100A, and the angled ends of optical fibers 101 are aligned directly above the emitting ends of the light sources. The ends of fibers 101 are preferably cleaved or polished to about 45 degree angles, but, as discussed above, the angle of the fiber depends upon the angle between the impinging light and the longitudinal axis of the fibers. The ends of fibers 101 are placed in contact with a partially reflective coating (not shown) so that most of the incoming light reflects along the length of fiber 101, but a portion transmits through fiber 101 to an intensity detector (not shown in FIG. 3).

Referring now to FIG. 4, the upper layers of the fiber array header 100 are shown. Light escaping from the end of fibers 101 is transmitted to detector 103 by a glass plate 111. The glass plate shown in the figure lies on top of the header block, but many alternative embodiments could be incorporated by one skilled in the art. For example, a triangular glass prism could be used in place of glass plate 111. The triangular prism aligns closely with the cleaved ends of fibers 101, and therefore transmits light to detector 103 very effectively. In the embodiment shown, the gaps between the ends of optical fibers 102 and glass plate 111 are preferably filled with an optical grade epoxy to aid in light transmission.

Detector 103 receives light transmitted through glass plate 111 from the optical fibers 102 and provides a feedback signal (not shown) to indicate the relative power of the light received. The signal can be transmitted through metal traces 115 on glass plate 111, or through a bonding wire connected to detector 103, or through any other known current conducting means. Detector 103 shown in FIG. 4 may be a single photodetector, or may comprise multiple photodetectors. If detector 103 is a single photodetector, then the signal output will preferably indicate the typical power of light reaching the detector from a representative light source 102. Alternatively, the output from detector 103 could indicate the total power of all of the light reaching detector 103 from all of the light sources 102 combined. If the detector comprises multiple photodetectors, then it is highly desirable to place an aperture 116 in the glass plate to prevent scattering of light from one light source onto a photodetector associated with another light source. Aperture 116 is preferably a metallic coating with an opening that is optically transparent.

In summary, an integrated header arrangement for a fiber optic communications system is disclosed. More particularly, a header for coupling an optical fiber to a light source that includes an integrated power monitor for tracking the intensity of light emanating from the source is disclosed. The header arrangement is particularly well-suited for use with vertical cavity surface emitting lasers (VCSELs), as well as in systems using arrays of multiple optical fibers.

The corresponding structures, materials, acts and equivalents of all elements in the claims below are intended to include any structure, material or acts for performing the functions in combination with other claimed elements as specifically claimed. The scope of the invention should be determined by the appended claims and their legal equivalents, rather than by the examples given above.

The claimed invention is:

1. A method of coupling light from an optical header having a light source and a detector to an optical fiber having an inner reflective surface, the method comprising the steps of:
   producing a light from the light source such that the light impinges upon the inner reflective surface to thereby form a first light component that is reflected substantially along the longitudinal axis of the optical fiber and a second light component that is transmitted through the inner reflective surface to the detector; and
   monitoring the second light component at the detector to thereby indicate the intensity of the light emanating from the light source.

2. The method of claim 1 further comprising the step of placing the optical fiber in, a groove prior to the aligning step.

3. The method of claim 2 wherein the aligning step comprises axially moving the optical fiber in the groove.

4. The method of claim 3 further comprising the step of axially adjusting the optical fiber through movement within the groove in response to the monitoring step.

5. The method of claim 4 wherein the adjusting step comprises maximizing the intensity of the light monitored by the detector.

6. The method of claim 1 further comprising the step of controlling the light source as a function of the intensity indicated in the monitoring step.

7. A header for a fiber optic array comprising a plurality of optical fibers, each optical fiber having a reflective surface and a longitudinal axis, the header comprising:
   a plurality of light sources configured to provide a light to the plurality of optical fibers, wherein each light source is aligned proximate to the reflective surface of a corresponding one of the plurality of optical fiber; and
   a detector located opposite the plurality of optical fibers from the plurality of light sources;
   wherein the light from the plurality of light sources impinges upon the plurality of optical fibers such that a first portion of the light is reflected substantially along the longitudinal axes of the optical fibers, and such that a second portion of the light is transmitted through the reflective surfaces to the detector.

8. The header of claim 7 further comprising a light transmission medium displaced between the plurality of optical fiber and the detector to transmit the second portion of light to the detector.

9. The header of claim 8 wherein the light transmission medium comprises a prism.

10. The header of claim 8 wherein the light transmission medium comprises a glass plate.

11. The header of claim 8 wherein the light transmission medium comprises an optical grade epoxy.

12. The header of claim 7 wherein the plurality of light sources comprises a plurality of vertical cavity surface emitting lasers (VCSELs).

13. A header for a fiber optic array comprising a plurality of optical fibers, each optical fiber having an end with a reflective angled surface and a longitudinal axis, the header comprising:
   a plurality of VCSELs configured to provide a light to the plurality of optical fibers, wherein each light source is aligned proximate to the end of a corresponding one of the plurality of optical fibers;
   a detector located opposite the plurality of optical fibers from the plurality of VCSELs;
   a light transmission medium been the plurality of optical fibers and the detector, wherein the light transmission medium comprises a prism configured to interface with the angled surfaces of the plurality of optical fibers; and
   wherein the light from the plurality of VCSELs impinges upon the plurality of optical fibers such that a first portion of the light is reflected substantially along the longitudinal axes of the optical fibers, and such that a second portion of the light is transmitted through the light transmission medium to the detector.

* * * * *

UNITED STATES PATENT AND TRADEMARK OFFICE
CERTIFICATE OF CORRECTION

| | |
|---|---|
| PATENT NO. | : 6,792,178 B1 |
| APPLICATION NO. | : 09/481627 |
| DATED | : September 14, 2004 |
| INVENTOR(S) | : Ping Zhou |

It is certified that error appears in the above-identified patent and that said Letters Patent is hereby corrected as shown below:

<u>Figure 4</u>
Change label "14" to --114--

<u>Column 3</u>
Line 41, change "Ian" to --an--
Line 47, change "3. A HEADER FOR A FIBER ARRAY" to --DETAILED DESCRIPTION OF PREFERRED EXEMPLARY EMBODIMENTS--

<u>Column 5</u>
Line 21, after "optical fiber in" remove [,]
Line 41, change "fiber;" to --fibers;--

<u>Column 6</u>
Line 9, change "optical fiber" to --optical fibers--
Line 31, change "been" to --between--

Signed and Sealed this

Twenty-fifth Day of July, 2006

JON W. DUDAS
*Director of the United States Patent and Trademark Office*